US 10,656,447 B2
(12) United States Patent
Teramoto

(10) Patent No.: US 10,656,447 B2
(45) Date of Patent: May 19, 2020

(54) BACK LIGHTED DISPLAY DEVICE WITH FITTED FRAME PORTIONS

(71) Applicant: MITSUBISHI ELECTRIC CORPORATION, Tokyo (JP)

(72) Inventor: Hiroshi Teramoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 488 days.

(21) Appl. No.: 15/451,892

(22) Filed: Mar. 7, 2017

(65) Prior Publication Data

US 2017/0261803 A1 Sep. 14, 2017

(30) Foreign Application Priority Data

Mar. 11, 2016 (JP) .................................. 2016-048532

(51) Int. Cl.
| | | |
|---|---|---|
| *G02F 1/13357* | (2006.01) | |
| *G02F 1/1333* | (2006.01) | |
| *G02F 1/133* | (2006.01) | |
| *G02F 1/1345* | (2006.01) | |

(52) U.S. Cl.
CPC .... *G02F 1/133308* (2013.01); *G02F 1/13306* (2013.01); *G02F 1/13452* (2013.01); *G02F 1/133345* (2013.01)

(58) Field of Classification Search
CPC ......... G02F 1/133608; G02F 1/133615; F21V 2200/20
See application file for complete search history.

(56) References Cited

U.S. PATENT DOCUMENTS

| | | | | |
|---|---|---|---|---|
| 5,729,310 A | * | 3/1998 | Horiuchi .............. | G02B 6/0083 349/58 |
| 6,392,724 B2 | * | 5/2002 | An ....................... | G02B 6/0088 349/58 |
| 6,502,945 B2 | * | 1/2003 | Kim ..................... | G02B 6/0031 349/64 |

(Continued)

FOREIGN PATENT DOCUMENTS

| | | |
|---|---|---|
| JP | 2000-242189 A | 9/2000 |
| JP | 2001-125073 A | 5/2001 |

(Continued)

OTHER PUBLICATIONS

An Office Action mailed by the Japanese Patent Office dated Dec. 3, 2019, which corresponds to Japanese Patent Application No. 2016-048532 and is related to U.S. Appl. No. 15/451,892.

*Primary Examiner* — Ismael Negron
(74) *Attorney, Agent, or Firm* — Studebaker & Brackett PC

(57) ABSTRACT

A display device includes: a display panel; a circuit board; a connection member, which connects the display panel and the circuit board; a backlight, which is configured by a first frame and a second frame to be fitted with the first frame; and an insulation sheet, which is disposed between the first frame and the circuit board to shut off an electrical connection between the first frame and the circuit board, wherein the insulation sheet includes: a seating portion that is formed in a shape corresponding to a shape of the circuit board; and an extension portion that extends to a fitting portion of the first frame and a fitting portion of the second frame, which are fitted to each other, and is attached to cover the fitting portions of the first frame and the second frame.

3 Claims, 5 Drawing Sheets

(56) References Cited

U.S. PATENT DOCUMENTS

| | | | | |
|---|---|---|---|---|
| 6,512,558 B2* | 1/2003 | Kim | ............... | G02F 1/133308 349/58 |
| 6,741,298 B1* | 5/2004 | Won | ............... | G06F 1/1616 349/58 |
| 7,113,237 B2* | 9/2006 | Nitto | ............... | G02F 1/133308 349/58 |
| 7,116,386 B2* | 10/2006 | Lee | ............... | G02F 1/133308 349/58 |
| 7,154,570 B2* | 12/2006 | Lee | ............... | G02B 6/0043 349/58 |
| 7,593,070 B2* | 9/2009 | Ogawa | ............... | G02B 6/0088 349/58 |
| 2007/0133222 A1* | 6/2007 | Watanabe | ............... | G02B 6/009 362/561 |
| 2014/0176863 A1 | 6/2014 | Oohira | | |
| 2014/0232945 A1* | 8/2014 | Uno | ............... | G02F 1/133615 348/739 |
| 2015/0062969 A1* | 3/2015 | Chen | ............... | G02B 6/0088 362/633 |
| 2015/0116628 A1* | 4/2015 | Huang | ............... | G02B 6/0091 349/58 |
| 2015/0131024 A1 | 5/2015 | Sakamoto | | |
| 2015/0355496 A1 | 12/2015 | Ooami | | |

FOREIGN PATENT DOCUMENTS

| | | |
|---|---|---|
| JP | 2008-170691 A | 7/2008 |
| JP | 2014-126685 A | 7/2014 |
| JP | 2015-094844 A | 5/2015 |
| JP | 2016-012120 A | 1/2016 |

* cited by examiner

BACK LIGHTED DISPLAY DEVICE WITH FITTED FRAME PORTIONS

CROSS-REFERENCE TO RELATED APPLICATION

This application claims priority from Japanese Patent Application No. 2016-048532 filed on Mar. 11, 2016, the entire subject matter of which is incorporated herein by reference.

TECHNICAL FIELD

This disclosure relates to a display device including a display panel that displays an image.

BACKGROUND

A general display device is configured with a display panel that displays an image and a backlight that irradiates the display panel with light. The backlight includes an optical member and is held by a first frame accommodating the optical member therein and a second frame engaging with the first frame. In the display device, the display panel is disposed on a light-emitting surface of the backlight, a circuit board is disposed on a back surface of the display device to supply a signal to the display panel, and the display device is held by a third frame from a display surface of the display panel. Further, the display device includes a flexible printed circuit board (hereinafter, referred to as FPC) on which a connection wiring is formed for connection between the circuit board that supplies the signal to the display panel and a signal input portion provided at an end of the display panel.

In the related arts, there are techniques disclosed in JP-A-2016-12120 and JP-A-2001-125073 in which frames disposed outside a display device are fixed to each other with tape or the like so as to enhance impact resistance strength against an external force or the like.

SUMMARY

Recently, the display device has been used in many fields, and is increasingly used even under an environment where an external force such as vibration or impact is applied. When the external force is applied to the display device, inner members perform various movements, whereby stress concentration is caused according to displacement of the members. When the stress exceeds allowable compression strength or tensile strength of each member, fracture or breakage occurs in connection portions between members having low rigidity or members having different rigidity, and occurs in joining portions between members having different weights, in particular.

In the backlight included in the display device, the first frame and the second frame are fitted and fixed to each other with claws or screws. In order to suppress deterioration in assembling properties or to set each of the members with high machining accuracy, however, a clearance may be set in the fitting portions. The clearance, which is set in the fitting portions at the time of manufacturing as described above, may cause relative displacement between the members due to an external force to be applied after the display device is assembled. As a result, the display panel and the circuit board included in the display device independently move, respectively, and stress is concentrated on an FPC through which two members are connected to each other, whereby display defects occur.

The configuration is disclosed in JP-A-2016-12120 and JP-A-2001-125073 in which the frames disposed outside the display device are attached to each other with the tape. However, when an external force is applied to each of the members disposed inside the display device, relative displacement occurs between the members, and the members may be broken by coming in contact with each other.

This disclosure is to provide a display device in which relative displacement between members is suppressed even when an external force is applied to the display device, thereby suppressing display defects of the display device.

A display device of this disclosure includes: a display panel; a circuit board, which is configured to input a signal to the display panel; a connection member, which connects the display panel and the circuit board; a backlight, which is configured by a first frame accommodating a light source and a second frame to be fitted with the first frame and which irradiates the display panel disposed on the second frame with light; and an insulation sheet, which is disposed between the first frame and the circuit board to shut off an electrical connection between the first frame and the circuit board, wherein the insulation sheet includes: a seating portion that is formed in a shape corresponding to a shape of the circuit board; and an extension portion that extends to a fitting portion of the first frame and a fitting portion of the second frame, which are fitted to each other, and is attached to cover the fitting portions of the first frame and the second frame.

According to the configuration of this disclosure, it is possible to suppress relative displacement between members and display defects of the display device even when the external force is applied to the display device.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
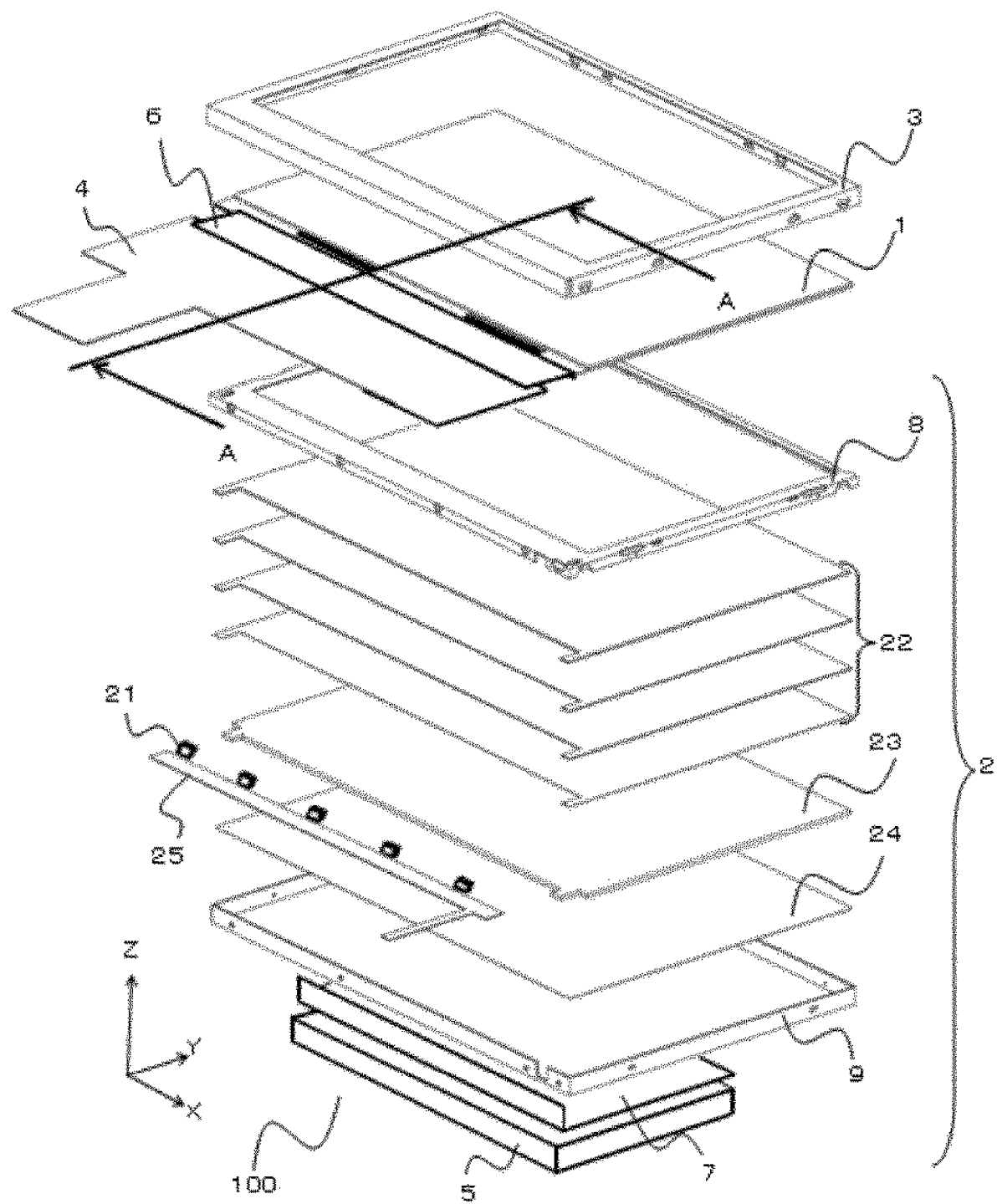
FIG. 1 is an exploded perspective view of a display device according to a first embodiment of this disclosure.

A structure of a display device according to this disclosure will be described below with reference to the accompanying drawings. In embodiments, the same reference numerals denote the same or substantially the same constituent elements.

First Embodiment

Figure 2:
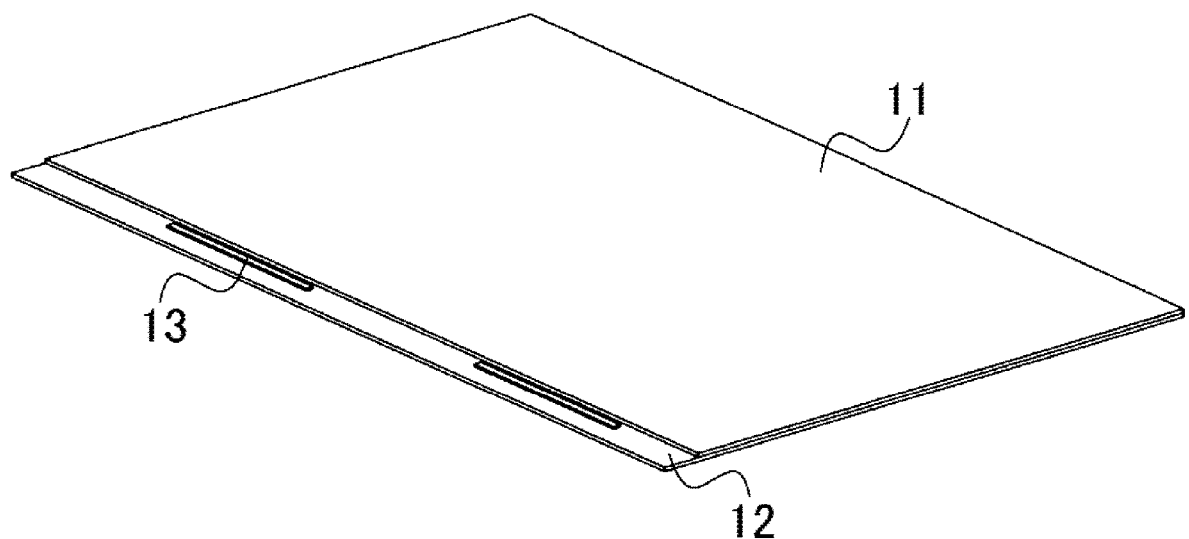
FIG. 2 is a perspective view of a display panel of this disclosure.
Figure 3:
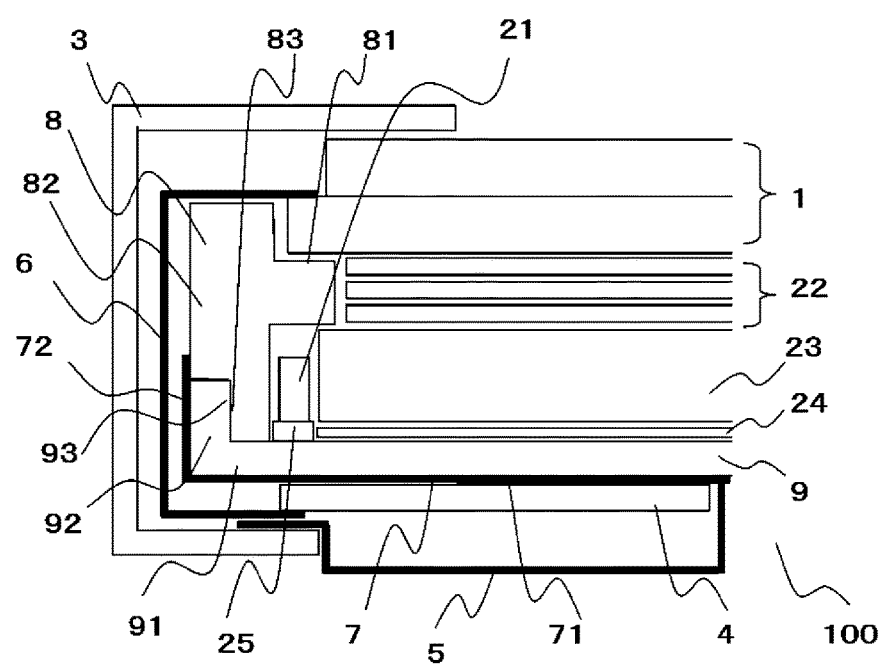
FIG. 3 is a cross-sectional view taken along line A-A of the display device illustrated in FIG. 1 which is in an assembled state.

FIG. 1 is an exploded perspective view of a display device 100 according to a first embodiment of this disclosure, FIG. 2 is a perspective view of a display panel 1 included in the display device 100 of this disclosure, and FIG. 3 is a cross-sectional view taken along line A-A of the display device 100 illustrated in FIG. 1 which is in an assembled state.

In FIGS. 1 to 3, the display device 100 of this disclosure includes the display panel 1, a backlight 2 that is disposed to irradiate the display panel 1 with light, and a front frame 3 that includes an opening, the display panel 1 and the backlight 2 being disposed therein. In addition, on the back surface of the display device 100, a circuit board 4 is disposed to input a signal to the display panel 1, and a shield metal 5 is provided as a cover for protecting the circuit board 4. The circuit board 4 and the display panel 1 are connected to each other through a flexible FPC 6. In addition, the front surface of the display device 100 may include a touch panel for inputting a position signal to a screen from the outside and a substantially transparent protection member for protecting the touch panel. In the following description, each constituent members will be described in detail.

<Display Panel>

In FIG. 2, the display panel 1 is configured with, for example, a transmission or semi-transmission liquid crystal display panel, and employs double refraction of the liquid crystal. The display panel 1 includes a first substrate 11 having a color filter (CF), a light shielding layer, and a counter electrode formed on an insulating substrate such as glass and a second substrate 12 having a thin film transistor (TFT) and a pixel electrode formed on an insulating substrate such as glass, the TFT serving as a switching element. Further, the display panel 1 is configured with a spacer used to hold a distance between the first substrate 11 and the second substrate 12, a sealing material used to bond the first substrate 11 and the second substrate 12 to each other, a liquid crystal sandwiched between both substrates, sealant for an inlet through which the liquid crystal is injected, an alignment film used to align the liquid crystal, a polarizing plate (not illustrated) disposed on an outer surface of both substrates, and a driving IC (Integrated Circuit) 13 disposed on an outer periphery of the second substrate 12. The driving IC 13 may be configured as a driving IC (Integrated Circuit) 13 disposed on TCP (Tape Carrier package) or COF (Chip On Film) which is a tape-like wiring material connected to the outer periphery of the second substrate 12 (which is not illustrated).

<Backlight>

As illustrated in FIG. 1 or 3, the backlight 2 includes: a light source substrate 25 having a light source 21 that emits light; a light guide plate 23 having a light-emitting surface through which the light emitted from the light source 21 is incident from a side surface and propagates the light to a front surface and a counter light-emitting surface positioned at a side opposite to the light-emitting surface; a plurality of optical sheets 22 that are disposed on the light-emitting surface of the light guide plate 23 so as to control distribution and spread of the light emitted from the light guide plate 23; a reflector 24 that allows the light coming out of the counter light-emitting surface of the light guide plate 23 to be directed toward the light guide plate 23 again; a rear frame 9 serving as a first frame that accommodates and holds these members; and a middle frame 8 serving as a second frame that engages with the rear frame 9. The backlight 2 irradiates the display panel 1 with light from the second substrate 12 opposite to a display surface of the display panel 1.

<Light Guide Plate>

The light guide plate 23 is made of, for example, a transparent acrylic resin, a polycarbonate resin, or glass, and at least one of the counter light-emitting surface and the light-emitting surface of the light guide plate 23 has a dot pattern for scattering that is provided thereon or a prism shape to emit light and adjust light intensity distribution in the surface and a light emitting direction.

<Optical Sheet>

The optical sheet 22 is disposed on the light guide plate 23 so as to adjust intensity distribution or emission angle of the emitting light. As the optical sheets 22, a plurality of lens sheets for condensing light, diffusion sheets for bringing into light uniformity, viewing angle adjustment sheets for adjusting brightness in a viewing angle direction are disposed, as necessary, depending on the purposes. The optical sheet 22 is made of a resin material such as polycarbonate (hereinafter referred to as PC) or polyethyrene terephthalate (hereinafter referred to as PET).

<Middle Frame>

The middle frame 8 has an opening which allows the light emitted from the light-emitting surface of the light guide plate 23 to be emitted therethrough. The display panel 1 is mounted and positioned around the upper surface side of the middle frame 8. The middle frame 8 can be made of a metal such as aluminum, stainless steel, or iron or be made of a resin material such as PC or acrylonitrile butadiene styrene (ABS).

<Rear Frame>

The rear frame 9 is desirably made of a metal having high thermal conductivity so as to conduct heat released from the light source 21. Particularly, in the case of using a housing made of aluminum or aluminum alloy having high thermal conductivity, it is possible to efficiently dissipate heat from the light source 21 and to suppress the heat from being accumulated in the backlight 2.

In general, the middle frame 8 and the rear frame 9 are fixed to each other by a hooking structure using claws or with screws, and are held with a clearance of several hundreds of micrometers to several millimeters.

<Light Source/Light Source Substrate>

As the light source 21, a point light source of RGB (three primary colors of Red, Green, and Blue), LEDs emitting colors other than RGB, or a fluorescent lamp (not illustrated) is disposed. In the case of using the point light source, the light source substrate 25, on which the point light source is mounted, may be made using a general glass epoxy resin as a base, or a flexible flat cable may be used. In order to enhance heat dissipation properties, alternatively, the substrate may be made using a metal such as aluminum or a ceramic as a base. The light source substrate 25 is attached to be fixed to the light guide plate 23 or the rear frame 9.

<Front Frame>

The front frame 3 is a frame-like member that holds the display panel 1 and the backlight 2, and is formed of, for example, a sheet metal or a resin molded product. The front frame 3 is fixed to the backlight 2 by a claw-shaped fixing structure or with screws. The front frame 3 may be integrally formed or may be formed by combining a plurality of members. The front frame 3 may be provided with mounting portions (screws, mounting holes, or the like) to be mounted to a final product on a side surface, a front surface, a back surface, or a peripheral portion thereof.

<Circuit Board>

The circuit board 4 controls the display panel 1 and the light source 21 by electrical input signals. Normally, the circuit board is configured in which electric components are mounted, by soldering, onto the surface of glass epoxy or the like having a copper pattern formed thereon. The circuit board 4 is mainly disposed on the back surface of the display device 100 (that is, a surface side from which light is not emitted).

<FPC>

The FPC 6 includes a wiring formed on a base material such as PET having flexibility to apply a signal to the display panel 1 therethrough, and is a connection member that connects a wiring end provided at a peripheral portion of the display panel 1 and the wiring formed on the circuit board 4 to each other. The FPC 6 is disposed to surround the side portion of the backlight 2.

<Shield Metal>

The shield metal 5 is formed of a metal such as aluminum, stainless steel, or galvanized steel sheet or a thin film-shaped resin such as PET, and is disposed to protect the circuit board 4 from external pressure or static electricity. The shield metal 5 is provided on the back surface of the display device 100 so as to cover the circuit board 4 at a position corresponding to the circuit board 4, thereby protecting components mounted on the circuit board 4. The shield metal 5 is engaged with the front frame 3 or is fixed to the rear frame 9 with screws.

<Insulation Sheet>

When the metallic shield metal 5 is disposed, insulation measures are taken by attaching an insulation sheet 7 made of a resin such as PET onto the circuit board 4 so that electric contact with the circuit board 4 or the electric components mounted on the circuit board 4 are avoided. Generally, the insulation sheet 7 has a shape corresponding to that of the circuit board 4, and is formed in a sheet shape to have a size equal to or larger than that of the circuit board 4. In this disclosure, the insulation sheet 7 has an adhesive on one surface and is fixed to the back surface of the rear frame 9.

In FIG. 3, the FPC 6 has one end connected to the end of the display panel 1 and the other end connected to the circuit board 4 disposed on the back surface of the display device 100. In addition, the FPC 6 is bent from the display panel 1 along the outer periphery of the side portions of the rear frame 9 and the middle frame 8 included in the backlight 2, and thus is connected to the circuit board 4. The rear frame 9 included in the backlight 2 has a lower portion 91 and a side portion 92. Further, the middle frame 8 has a surface in a direction parallel to the display panel 1 and includes a holding portion 81 for holding the display panel 1 and a side portion 82. The rear frame 9 and the middle frame 8 are provided with fitting portions at positions corresponding to each other and are fixed to each other by the fitting portions. In this embodiment, as illustrated in FIG. 3, a fitting portion 93 is formed at a part of the side portion 92 of the rear frame 9, and a fitting portion 83 is formed at the side portion 82 of the middle frame 8 corresponding to the fitting portion 93. Each of the fitting portions 83 and 93 is configured with a recess portion, and the side portion 92 of the rear frame 9 is formed to cover the side portion 82 of the middle frame 8. The fitting portions, which are illustrated in the drawing, may have a hooking structure with a claw configuration. In addition, the fitting portions may be configured with screws. In order to suppress deterioration in assembling properties or to set each of the members with high machining accuracy, clearance is appropriately set in the fitting portions.

Figure 8:
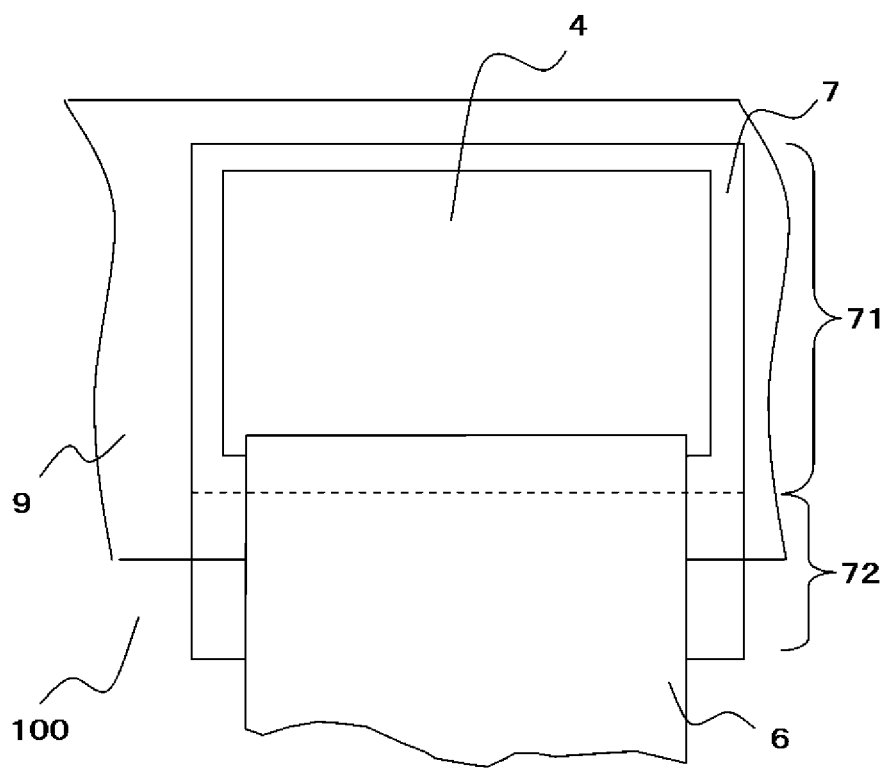
FIG. 8 is a plan view of the display device as viewed from the back surface side.

FIG. 8 is a plan view of the display device 100 as viewed from the back surface (however, the shield metal 5 is not illustrated). As illustrated in FIG. 8, according to the display device 100 of this disclosure, the insulation sheet 7 is disposed corresponding to the position at which the circuit board 4 is fixed. In addition, the insulation sheet 7 includes a seating portion 71 (a seating portion on which the circuit board is disposed) formed in a shape corresponding to that of the circuit board 4 at a position corresponding to the circuit board 4, and an extension portion 72 extending from the seating portion 71. The extension portion 72 is attached so as to be fixed over the fitting portions 83 and 93 of the rear frame 9 and the middle frame 8, whereby both of the rear frame 9 and the middle frame 8 are fixed to each other. That is, the insulation sheet 7 of this disclosure is disposed in a lower portion 91 of the rear frame, and includes the extension portion 72 extending from the seating portion 71 disposed at the position corresponding to the circuit board 4. The fitting portion 93 of the rear frame 9 and the fitting portion 83 of the middle frame 8 are attached and fixed to each other by the extension portion 72.

<Effect>

As described above, the clearance set in the fitting portions 93 and 83 of the rear frame 9 and the middle frame 8 at the time of manufacturing may cause relative displacement between the members after the display device 100 is assembled. When the relative displacement between the rear frame 9 and the middle frame 8 is caused, the display panel 1 and the circuit board 4 included in the display device 100 independently move, respectively, and stress is concentrated on the FPC 6 serving as a connection member through which two members are connected to each other. In this case, accordingly, there were cases where the FPC 6 was broken and display defects occurred.

In view of this, according to the display device 100 of this disclosure, the insulation sheet 7 disposed between the circuit board 4 and the rear frame 9 includes the extension portion 72 extending to the fitting portions 93 and 83, which are formed at the side portion 92 of the rear frame 9 and the side portion 82 of the middle frame 8, respectively, and is attached to cover the fitting portions 93 and 83. That is, the side portion 92 from the lower portion 91 of the rear frame 9 and the side portion 82 of the middle frame 8 are attached together with a single insulation sheet 7. Thereby, the relative displacement between the rear frame 9 and the middle frame 8 can be suppressed even when the stress due to the external force against the display device 100 is applied to the fitting portions 93 and 83. Therefore, it is possible to suppress movement of the middle frame 8 and the rear frame 9 to be caused by impact, that is, relative displacement caused between the members. As a result, vibration resistance and impact resistance of the display device 100 are improved. When the stress is suppressed from being transmitted to the FPC 6, it is possible to suppress disconnection of the FPC 6 and display defects of the display device 100.

Since the display device 100 of this disclosure can be achieved by providing the extension portion 72 in the insulation sheet 7 disposed between the rear frame 9 and the circuit board 4, performance thereof can be improved without an increase in costs due to the additional member.

Figure 4:
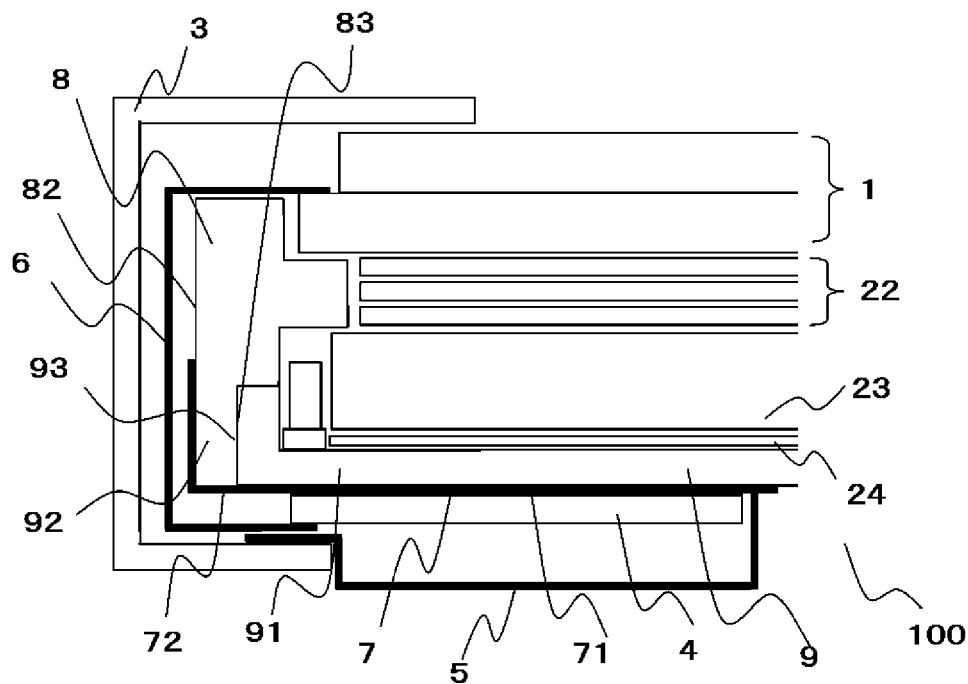
FIG. 4 is a cross-sectional view taken along ling A-A of the display device illustrated in FIG. 1 which is in an assembled state.

FIG. 4 is a cross-sectional view illustrating a display device 100 according to a modified example of the first embodiment. In the display device 100 illustrated in FIG. 3, the fitting portion 83 formed in the middle frame 8 is covered with the fitting portion 93 of the rear frame 9. In contrast, according to the modified example illustrated in FIG. 4, the fitting portion 93 is covered with the fitting portion 83. Since the fitting portions are disposed in the vicinity of the seating portion 71 of the insulation sheet 7, the extension portion 72 of the insulation sheet 7 can be shortened in extension width. As illustrated in FIG. 4, the extension portion 72 of the insulation sheet 7 extends to the side portion 82 of the middle frame 8, resulting in increasing a bonding area, and thus more stable fixing can be achieved.

Second Embodiment

Figure 5:
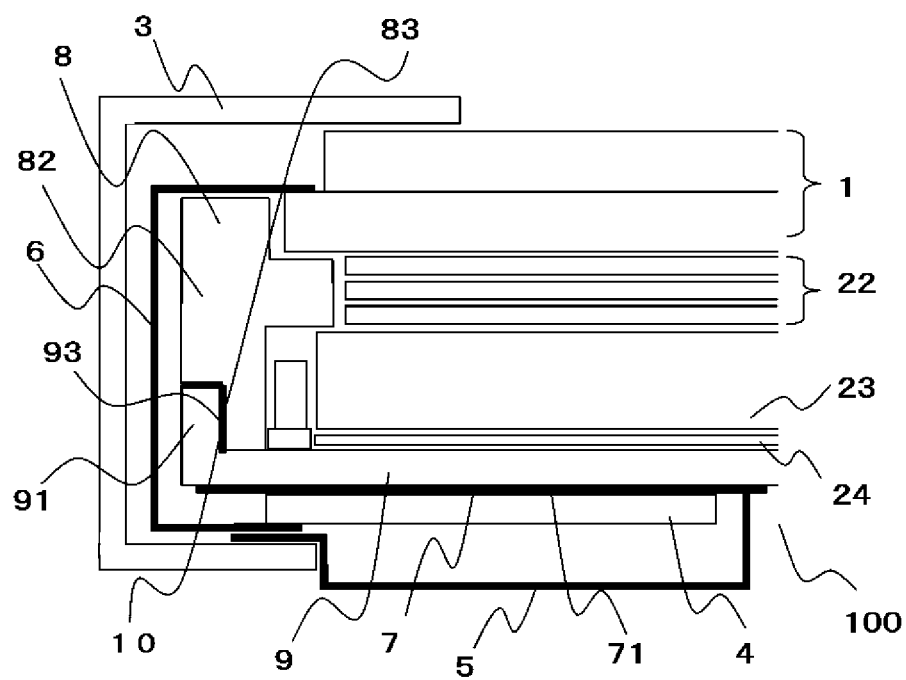
FIG. 5 is a cross-sectional view of a display device according to a second embodiment.

FIG. 5 is a cross-sectional view of a display device 100 according to a second embodiment of this disclosure. In the first embodiment, the fitting portions 83 and 93 of the middle frame 8 and the rear frame 9 are attached and fixed to each other by the extension portion 72 of the insulation sheet 7. In the display device 100 according to the second embodiment, however, as illustrated in FIG. 5, when a fitting portion 93 of a rear frame 9 is fitted to a fitting portion 83 of a middle frame 8, the fitting portion 93 of the rear frame 9 is heated to dissolve a bonding member 10 disposed between the fitting portions, and is then welded into the fitting portion 83 of the middle frame 8. The bonding member 10 made of acrylic or epoxy resin is disposed on joining portions (fitting portions), and the joining portions are joined to each other by dissolving of the adhesive 10.
<Effect>
According to the second embodiment, since the fitting portions 93 and 83 are joined to each other by the adhesive 10, it is possible to fix the fitting portions more firmly compared to the first embodiment, suppress occurrence of relative displacement between the members, and suppress display defects.

Third Embodiment

Figure 6:
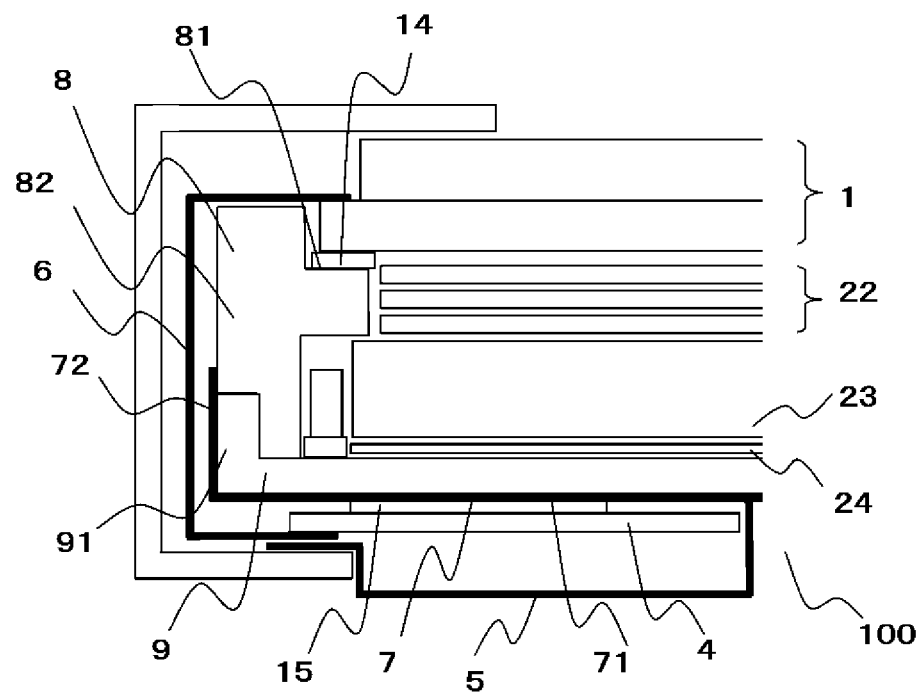
FIG. 6 is a cross-sectional view of a display device according to a third embodiment.

FIG. 6 is a cross-sectional view of a display device according to a third embodiment of this disclosure. In the first embodiment, the fitting portions 83 and 93 of the middle frame 8 and the rear frame 9 are attached and fixed to each other by the extension portion 72 of the insulation sheet 7. However, the display device 100 according to the third embodiment includes an adhesive 14 provided on a panel holding portion 81 to fix a display panel to a middle frame 8 and an adhesive 15 provided on an insulation sheet 7 to fix a circuit board 4 to a rear frame 9.

In the third embodiment, the panel holding portion 81 defines a seat of the middle frame 8 for receiving the display panel 1 or an XY direction of the display panel 1 to be parallel, and the adhesives 14 and 15 are disposed on the panel holding portion 81 disposed in parallel with the display panel 1 and on the surface of the insulation sheet 7 in parallel with a circuit board 4 disposed on the rear frame 9, respectively.
<Effect>
According to the third embodiment, the adhesives 14, 15 are disposed, and thus relative displacement between the display panel 1 and the middle frame 8 and relative displacement between the circuit board 4 and the rear frame 9 can be reduced. Accordingly, the stress is suppressed from being transmitted to an FPC 6, whereby disconnection of the FPC 6 can be suppressed, vibration resistance and impact resistance of the display device can be improved, and display defects of the display device 100 can be suppressed.

Fourth Embodiment

Figure 7:
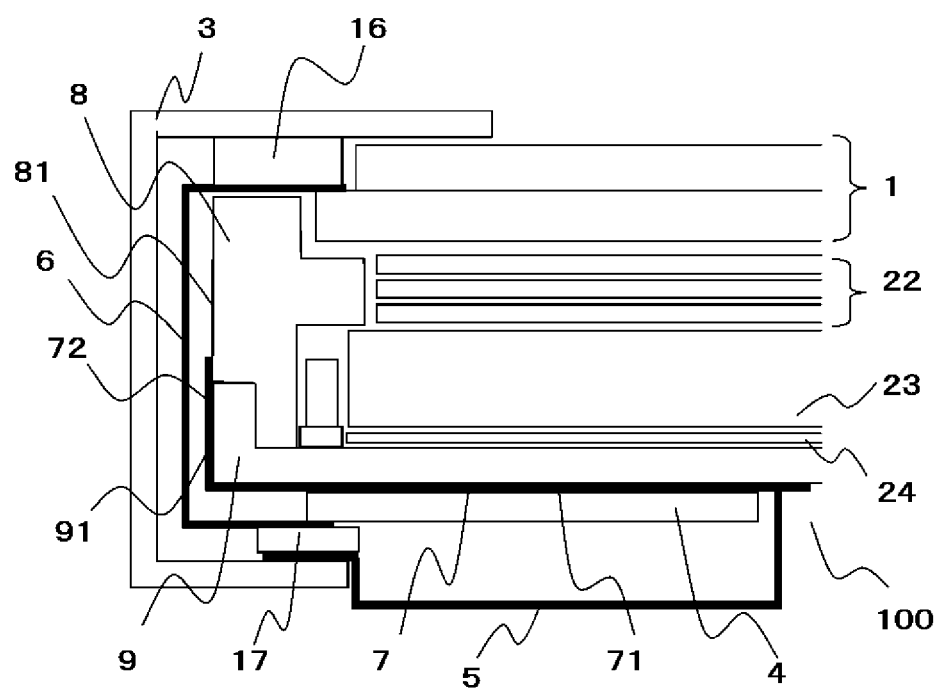
FIG. 7 is a cross-sectional view of a display device according to a fourth embodiment.

FIG. 7 is a cross-sectional view of a display device according to a fourth embodiment of this disclosure. In the third embodiment, the adhesives 14 and 15 are respectively disposed at the position where the middle frame 8 corresponds to the panel holding portion 81 and the position where the insulation sheet 7 corresponds to the circuit board 4. In the fourth embodiment, however, as illustrated in FIG. 7, a cushion member 16 is disposed in a clearance in a Z direction (a longitudinal direction in the drawing) with a front frame 3 in the vicinity of a connection portion between an FPC 6 and a display panel 1. In addition, a cushion member 17 is disposed in a clearance in the Z direction with the front frame 3 or a shield metal 5 in the vicinity of a connection portion between the circuit board 4 and the FPC 6. The cushion members 16 and 17 are made of a foaming base material, and either one or both of the cushion members 16 and 17 may be disposed corresponding to the clearance.
<Effect>
According to the display device 100 of the fourth embodiment, it is possible to reduce displacement between the front frame 3 and the display panel 1 and between the shield metal 5 and the circuit board 4 caused by vibration, attenuate a propagation speed of vibration to be applied to the display device 100, suppress vibration from being transmitted to the FPC 6 and disconnection of the FPC 6, and improve vibration resistance and impact resistance of the display device.

It is understood that the respective embodiments of this disclosure can be freely combined within the scope of this disclosure. Alternatively, the respective embodiments can appropriately be modified and omitted.

What is claimed is:

1. A display device comprising:
   a display panel;
   a circuit board configured to provide a signal to the display panel;
   a connection member for connecting the display panel and the circuit board;
   a backlight including a light source, a first frame accommodating the light source and including a first fitting portion, and a second frame to be fitted with the first frame and including a second fitting portion, the display panel being disposed on the second frame such that the display panel is irradiated by the light source; and
   an insulation sheet disposed between the first frame and the circuit board to electrically insulate the first frame from the circuit board,
   wherein the insulation sheet includes:
      a seating portion formed in a shape corresponding to a shape of the circuit board; and
      an extension portion extending from the seating portion to the first fitting portion and the second fitting portion, the first and second fitting portions being fitted to each other and covered by the extension portion.

2. The display device according to claim 1, further comprising:
   a first adhesive fixing the display panel to the second frame; and
   a second adhesive fixing the circuit board to the insulation sheet.

3. The display device according to claim 1, further comprising:
   a third frame accommodating the display panel; and
   a cushion disposed between the third frame and the connection member in the vicinity of a connection portion between the display panel and the connection member.

* * * * *